(12) United States Patent
Lu et al.

(10) Patent No.: US 12,108,120 B2
(45) Date of Patent: Oct. 1, 2024

(54) METHOD FOR PROCESSING VIDEO, DEVICE AND STORAGE MEDIUM

(71) Applicants: Beijing Baidu Netcom Science Technology Co., Ltd., Beijing (CN); Baidu USA LLC, Sunnyvale, CA (US)

(72) Inventors: Daming Lu, Sunnyvale, CA (US); Yichen Hu, Sunnyvale, CA (US); Xi Chen, Sunnyvale, CA (US); Hao Tian, Sunnyvale, CA (US); Xing Li, Sunnyvale, CA (US)

(73) Assignees: BEIJING BAIDU NETCOM SCIENCE TECHNOLOGY CO., LTD., Beijing (CN); BAIDU USA LLC, Sunnyvale, CA (US)

(*) Notice: Subject to any disclaimer, the term of this patent is extended or adjusted under 35 U.S.C. 154(b) by 344 days.

(21) Appl. No.: 17/651,714

(22) Filed: Feb. 18, 2022

(65) Prior Publication Data
US 2022/0174369 A1    Jun. 2, 2022

(30) Foreign Application Priority Data

Feb. 23, 2021    (CN) .......................... 202110200351.7

(51) Int. Cl.
*H04N 7/10*    (2006.01)
*G06F 16/783*    (2019.01)
(Continued)

(52) U.S. Cl.
CPC ....... *H04N 21/4886* (2013.01); *G06F 16/784* (2019.01); *G06F 16/7844* (2019.01);
(Continued)

(58) Field of Classification Search
CPC .......... H04N 21/4886; H04N 21/4882; H04N 21/23412; H04N 21/440236;
(Continued)

(56) References Cited

U.S. PATENT DOCUMENTS 10,715,854 B2    7/2020    Zhu
10,721,525 B2    7/2020    Nakagawa et al.
(Continued)

FOREIGN PATENT DOCUMENTS

CN    103559214 A    2/2014
CN    104618806 A    5/2015
(Continued)

OTHER PUBLICATIONS

Extended European Search Report of May 20, 2022 for European Patent Application No. 22157251.4. 8 pages.

*Primary Examiner* — Jefferey F Harold
*Assistant Examiner* — Sahar Aqil Riaz
(74) *Attorney, Agent, or Firm* — Knobbe, Martens, Olson & Bear, LLP

(57) ABSTRACT

The present disclosure provides examples of a method and apparatus for processing a video, a device and a storage medium. The method may include: acquiring a target video and a target comment of the target video; recognizing a picture in the target video to obtain text information of the picture; determining a target comment matching a content of the text information; and inserting, in response to displaying the picture in the target video, the target comment matching the content in a form of a bullet screen.

18 Claims, 5 Drawing Sheets

(51) Int. Cl.
  *G06F 40/284* (2020.01)
  *G06V 40/16* (2022.01)
  *H04N 21/488* (2011.01)
(52) U.S. Cl.
  CPC .......... *G06F 40/284* (2020.01); *G06V 40/161* (2022.01); *H04N 21/4882* (2013.01)
(58) Field of Classification Search
  CPC ............ H04N 21/8133; H04N 21/435; H04N 21/4788; H04N 21/431; G06F 16/784; G06F 16/7844; G06F 40/284; G06F 16/739; G06V 40/161
  USPC ........................................................ 725/32
  See application file for complete search history.

(56) References Cited

U.S. PATENT DOCUMENTS

| | | | |
|---|---|---|---|
| 10,885,344 B2 | 1/2021 | Tian et al. | |
| 11,218,768 B2 | 1/2022 | Nakagawa et al. | |
| 2007/0288978 A1* | 12/2007 | Pizzurro | H04N 21/23412 725/135 |
| 2008/0124056 A1* | 5/2008 | Concotelli | G11B 27/034 386/280 |
| 2011/0061108 A1* | 3/2011 | Arrasvuori | G06F 21/10 709/219 |
| 2011/0202967 A1* | 8/2011 | Hecht | H04N 21/854 725/114 |
| 2015/0382077 A1* | 12/2015 | Liu | H04N 21/8133 725/32 |
| 2016/0301650 A1 | 10/2016 | Oztaskent et al. | |
| 2017/0034237 A1* | 2/2017 | Silver | H04N 5/272 |
| 2018/0152767 A1* | 5/2018 | Liu | H04N 21/4781 |
| 2019/0332694 A1 | 10/2019 | Tcherechansky et al. | |
| 2020/0320253 A1 | 10/2020 | Tian et al. | |
| 2020/0366965 A1* | 11/2020 | Gao | H04N 21/4882 |
| 2021/0185386 A1* | 6/2021 | Kong | H04N 21/4394 |
| 2022/0188357 A1* | 6/2022 | Tang | G06V 20/46 |
| 2022/0201364 A1* | 6/2022 | Kong | H04N 21/4884 |

FOREIGN PATENT DOCUMENTS

| | | |
|---|---|---|
| CN | 104967896 A | 10/2015 |
| CN | 105554582 A | 5/2016 |
| CN | 109618236 A | 4/2019 |
| CN | 110267113 A | 9/2019 |
| CN | 110366002 A | 10/2019 |
| CN | 110377842 A | 10/2019 |
| CN | 110650377 A | 1/2020 |
| CN | 110740387 A | 1/2020 |
| CN | 111327960 A | 6/2020 |
| CN | 111711865 A | 9/2020 |
| CN | 11179879 A | 10/2020 |
| CN | 113905125 A | 1/2022 |
| JP | 2006-155384 A | 6/2006 |
| JP | 2006-352779 A | 12/2006 |
| JP | 2011-151741 A | 8/2011 |
| JP | 2018-525745 A | 9/2018 |
| JP | 2019-161465 A | 9/2019 |
| WO | WO 2016/088566 A1 | 6/2016 |

* cited by examiner

METHOD FOR PROCESSING VIDEO, DEVICE AND STORAGE MEDIUM

CROSS-REFERENCE TO RELATED APPLICATIONS

The present application claims the priority of Chinese Patent Application No. 202110200351.7, titled "METHOD AND APPARATUS FOR PROCESSING VIDEO, DEVICE AND STORAGE MEDIUM", filed on Feb. 23, 2021, the content of which is incorporated herein by reference in its entirety.

TECHNICAL FIELD

Embodiments of the present disclosure relate to the technical fields of computers, specifically to natural language processing, and in particular to a method and apparatus for processing a video, a device and a storage medium.

BACKGROUND

With the development of network technology, various video applications emerge endlessly. In order to enhance the interaction between video viewers, the video applications allow the video viewers to add comments and enable the comments to flow across a video screen. Since the effect of a large number of the comments floating across the video screen looks like a bullet screen in flying shooting game, these comments are also called bullet screen comments.

SUMMARY

Embodiments of the present disclosure provide a method for processing a video, a device and a storage medium.

According to a first aspect, embodiments of the present disclosure provide a method for processing a video, and the method includes: acquiring a first target video and a target comment of the target video; recognizing a picture in the target video to obtain text information of the picture; determining a second target comment matching a content of the text information from the first target comment; and inserting, in response to displaying the picture in the target video, the second target comment matching the content in a form of a bullet screen.

According to a second aspect, embodiments of the present disclosure provide an electronic device, and the electronic device includes: at least one processor; and a memory communicatively connected to the at least one processor, where the memory stores instructions executable by the at least one processor, and the instructions, when executed by the at least one processor, cause the at least one processor to implement the method as described in any one of the implementations of the first aspect.

According to a third aspect, embodiments of the present disclosure provide a non-transitory computer-readable storage medium storing computer instructions, which cause a computer to execute the method as described in any one of the implementations of the first aspect.

It should be appreciated that the contents described in this section are not intended to identify the key or critical features of embodiments of the disclosure, nor is it intended to limit the scope of the disclosure. The other features of the disclosure will become easy to understand through the following description.

BRIEF DESCRIPTION OF THE DRAWINGS

By reading the detailed description of non-limiting embodiments with reference to the following accompanying drawings, other features, objects and advantages of the present disclosure will become more apparent. The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
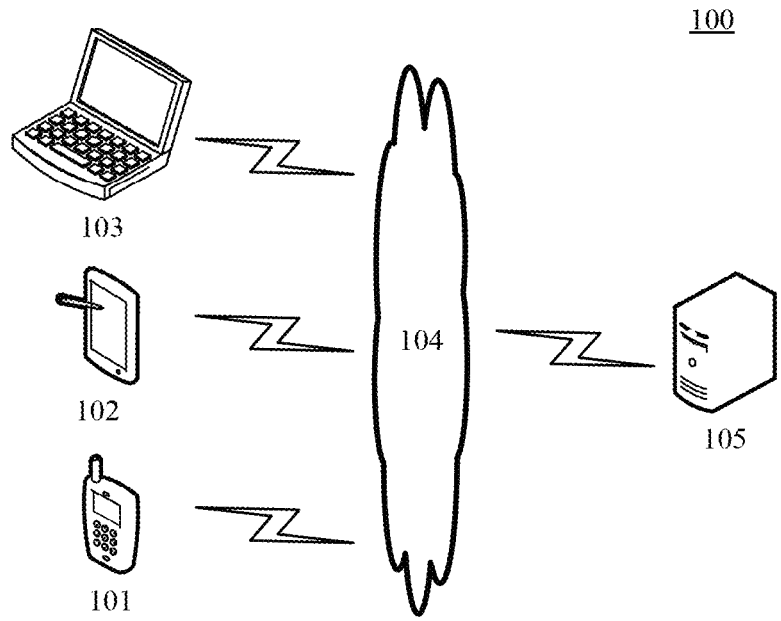
FIG. 1 is an example system architecture to which some embodiments of the present disclosure may be applied.

FIG. 1 shows an example system architecture 100 to which embodiments of a method or apparatus for processing a video according to the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, 103 to interact with the server 105 through the network 104 to receive or post video frames, and the like. Various client applications, such as news applications, web browser applications, and search applications, may be installed on the terminal devices 101, 102, 103.

The terminal devices 101, 102, 103 may be hardware or software. When the terminal devices 101, 102, 103 are hardware, the terminal devices 101, 102, 103 may be various electronic devices, including but not limited to, a smart phone, a tablet computer, a laptop portable computer and a desktop computer; and when the terminal devices 101, 102, 103 are software, the terminal devices 101, 102, 103 may be installed in the electronic devices, and may be implemented as multiple software pieces or software modules, or as a single software piece or software module, which is not specifically limited herein.

The server 105 may provide various services. For example, the server 105 may analyze and process a video displayed on the terminal devices 101, 102, 103, and generate a processing result (such as a video with a bullet screen inserted at an appropriate time).

It should be noted that the server 105 may be hardware or software. When the server 105 is hardware, the server 105 may be implemented as a distributed server cluster composed of multiple servers, or as a single server; and when the server 105 is software, the server 105 may be implemented as multiple software pieces or software modules (such as for providing distributed services), or as a single software piece or software module, which is not specifically limited herein.

It should be noted that the method for processing a video provided by embodiments of the present disclosure is generally executed by the server 105. Correspondingly, the apparatus for processing a video is also generally provided in the server 105.

It should be appreciated that the number of the terminal devices, the network and the server in FIG. 1 is merely illustrative. Any number of terminal devices, networks and servers may be provided based on actual requirements.

Figure 2:
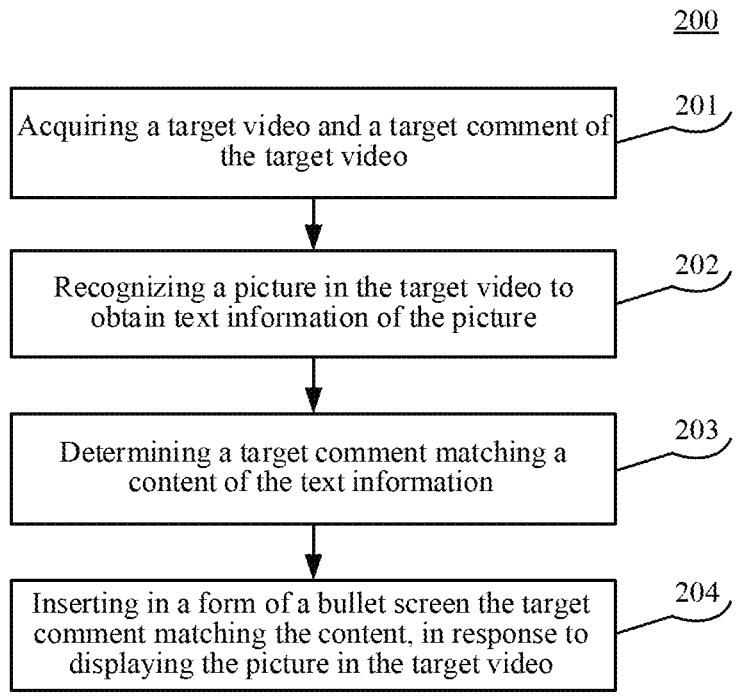
FIG. 2 is a flowchart of a method for processing a video according to some embodiments of the present disclosure.

Further referring to FIG. 2, FIG. 2 shows a flow 200 of a method for processing a video according to some embodiments of the present disclosure. The method for processing a video includes steps 201 to 204.

Step 201 includes acquiring a target video and a target comment of the target video.

In this embodiment, an execution body of the method for processing a video (for example, the server 105 shown in FIG. 1) may acquire the target video and the target comment of the target video. The target video may be a video recording a specific content. The target comment may be a user comment on the specific content.

In some alternative implementations of this embodiment, the target video may be a video provided by a video application. The target comment may be a comment sent by a user watching the target video on the video application. Generally, when the user plays the target video on the video application, the video application may provide a comment input box at a specific position. The user may post the comment by inputting the comment into the comment input box. In order to prevent the comment input box from blocking the target video, the comment input box is generally disposed below the target video. In some embodiments, in order to prevent the comment from blocking the target video, the comment sent by the user may be displayed below the target video. In some embodiments, in order to achieve interaction between users watching the target video, comments sent by the users may be displayed on the target video in the form of bullet screen.

In some alternative implementations of this embodiment, the target video may be a video for a news event. The target comment may be a user comment on the news event. For example, the target video may be a video synthesized based on original news of the news event. The target comment may be a comment sent by a user browsing the original news. Generally, when the user browses the original news on a news application, the news application may provide a comment input box at a specific position. The user may post the comment by inputting the comment into the comment input box. In order to prevent the comment input box and the comment from blocking the original news, the comment input box is generally disposed below the original news, and the comment sent by the user is generally displayed below the original news. The original news may be various forms of electronic data for news events. A news event may be any type of original event material recorded in any form such as a text, an image, an audio and a video, which includes, but is not limited to, a social event, a financial event, an entertainment event, a scientific and technological event, a military event, a fictional story, and the like. The original news may include at least one of a text, an image, an audio or a video. For example, the original news may be a web page. The web page may include at least one of a text, an image, an audio or a video. In addition, the original news may be merely a text, an image or a video.

The target comment may be all or part of user comments on a specific content. Generally, in order to match the target comment with a content of the target video, the user comments on the specific content may be filtered, and only a comment matching the content of the target video is retained as the target comment. For example, if the target video is a video synthesized based on original news of a news event, original comments of the original news may be acquired, and an original comment matching the content of the target video is selected as the target comment. Here, the original comment may be a comment sent by a user browsing the original news on a news application.

In some alternative implementations of this embodiment, the execution body may first perform lexical analysis on the original comment to segment the original comment into a word, analyze the original comment by using the word as an anchor point, and select the original comment matching the content of the target video. The original comment is generally a Chinese comment. Unlike an English comment, Chinese words in the Chinese comment are not separated by spaces. In order to improve an accuracy of word segmentation, the original comment may be segmented into words by using LAC (Lexical Analysis of Chinese). The LAC, as a combined lexical analysis model, can integrally complete NLP (Natural Language Processing) tasks such as Chinese word segmentation, part-of-speech tagging, and proper name recognition. Based on a stacked two-way GRU (Gated Recurrent Unit) structure, the LAC accurately replicates, on a long text, a lexical analysis algorithm on an AI (Artificial Intelligence) open platform.

Step 202 includes recognizing a picture in the target video to obtain text information of the picture.

In this embodiment, the execution body may recognize each frame of picture in the target video to obtain the text information of the picture. The text information of the picture may be used to describe a content of the picture. In some cases, there is a text on the picture, and the text on the picture may be recognized as the text information of the picture. In some cases, there is a human face on the picture, and the human face on the picture may be recognized, and information of a person corresponding to the human face is used as the text information of the picture.

Step 203 includes determining a target comment matching a content of the text information.

In this embodiment, the execution body may determine the target comment matching the content of the text information. Specifically, for each target comment, a matching may be performed between a content of each target comment and a content of the text information of the picture, and whether the contents are matched is determined based on comparison results. For example, a target comment with a matching degree higher than a preset threshold is determined as the target comment matching the content of the text information of the picture. For another example, a target comment with the highest matching degree is determined as the target comment matching the content of the text information.

Step 204 includes inserting the target comment matching the content in a form of a bullet screen, in response to displaying the picture in the target video.

In this embodiment, the execution body may insert, in response to displaying the picture in the target video, the target comment matching the content in the form of the bullet screen.

Specifically, when the target video is played, if the picture is displayed at a certain moment, the execution body may insert the target comment matching the content at this moment, so that the comment matching the content may be displayed simultaneously with the picture matching the content. In addition, the target comment matching the content may be displayed on the target video in the form of a bullet screen, which may achieve interaction between users watching the target video. For example, for a movie and a movie review, the movie review matching a content of the movie is inserted in a section of the movie. In this case, a bullet screen corresponding to the movie review matching the content of the movie may be played in an appropriate section during a playback of the movie based on the movie review.

According to the method for processing a video provided by some embodiments of the present disclosure, the target video and the target comment of the target video are first acquired; then, the picture in the target video is recognized to obtain the text information of the picture; the target comment matching the content of the text information is determined; and finally, in response to displaying the picture in the target video, the target comment matching the content is inserted in the form of the bullet screen. The comment matching the content is inserted based on the display moment of the picture in the video, so that when the video is played, the comment for the specific content can be displayed simultaneously with the picture having the specific content, thereby facilitating users to understand comments and further helping video viewers interact based on the comments.

Figure 3:
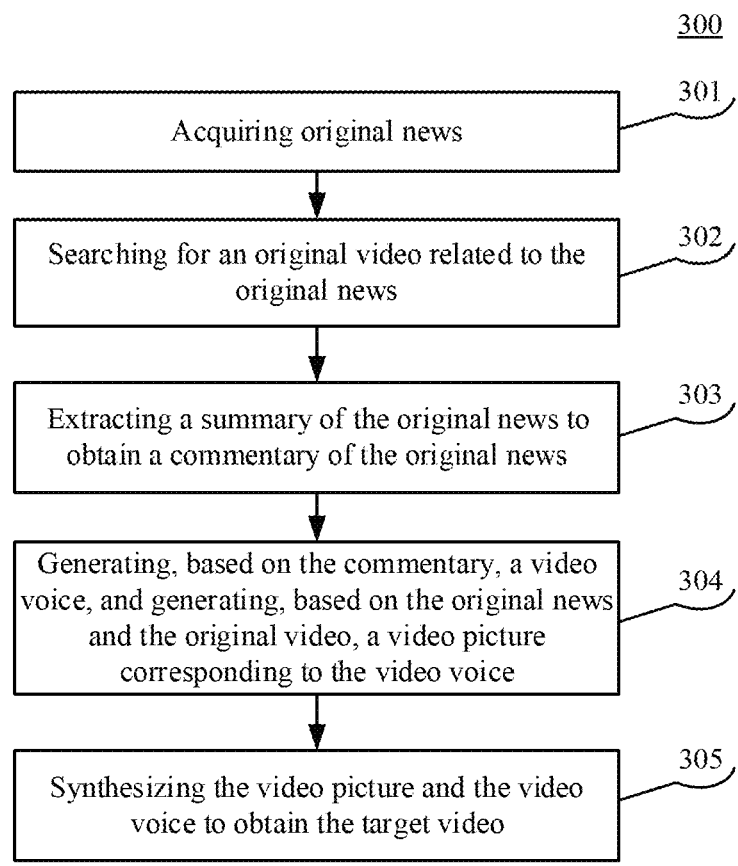
FIG. 3 is a flowchart of a method for acquiring a video according to some embodiments of the present disclosure.

Further referring to FIG. 3, FIG. 3 shows a flow 300 of a method for acquiring a video according to some embodiments of the present disclosure. The method for acquiring a video includes steps 301 to 305.

Step 301 includes acquiring original news.

In this embodiment, an execution body of the method for acquiring a video (for example, the server 105 shown in FIG. 1) may acquire the original news. The original news may be news provided by a news application. The original news may be various forms of electronic data for news events. A news event may be any type of original event material recorded in any form such as a text, an image, an audio and a video, and includes, but is not limited to, a social event, a financial event, an entertainment event, a scientific and technological event, a military event, a fictional story, and the like. The original news may include at least one of a text, an image, an audio or a video. For example, the original news may be a web page. The web page may include at least one of a text, an image, an audio or a video. In addition, the original news may be merely a text, an image or a video.

Step 302 includes searching for an original video related to the original news.

In this embodiment, the execution body may search for the original video related to the original news. The original video is directly or indirectly related to the original news.

In some alternative implementations of this embodiment, the execution body may first acquire an original comment of the original news, and then search for an original video based on a content of the original news and/or a content of the original comment. Generally, an original video obtained by searching based on the content of the original news is directly related to the original news; and an original video obtained by searching based on the content of the original comment is directly or indirectly related to the original news. For example, the original news is news about Person A, and an original video obtained by searching based on the news about Person A may be a video about Person A. The video about Person A is directly related to the news about Person A. An original comment may be a comment about Person A, and an original video obtained by searching based on the comment about Person A may be a video about Person A. The video about Person A is directly related to the news about Person A. An original comment may alternatively be a comment about Person B associated with Person A, and an original video obtained by searching based on the comment about Person B associated with Person A may be a video about Person B. The video about Person B is indirectly related to news about Person A.

Step 303 includes extracting a summary of the original news to obtain a commentary of the original news.

In this embodiment, the execution body may perform a summary extraction on the original news, and determine a summary text obtained through the summary extraction as the commentary of the original news. The commentary may include a main content of the original news, and conform to human speech habits, and be suitable for commentary.

In some alternative implementations of this embodiment, the execution body may first determine a text included in the original news, subsequently delete a portion unsuitable for commentary from the text, then replace a written language word included in the text with a colloquial word having same semantics, and finally extract a summary of the text to obtain a commentary of the original news. Deleting the text portion unsuitable for commentary may reduce invalid information of the text, and may further increase a content proportion of valid information of a finally generated commentary. Replacing the written language word in the text with the colloquial word may make the text more suitable for commentary, and may further make the text even more suitable for generating a commentary conforming to human speech habits.

Step 304 includes generating, based on the commentary, a video voice, and generating, based on the original news and the original video, a video picture corresponding to the video voice.

In this embodiment, the execution body may generate, based on the commentary, the video voice, and generate, based on the original news and the original video, the video picture corresponding to the video voice. Specifically, the execution body may first generate the video voice corresponding to the commentary by using a speech synthesis technology, divide the video voice into a voice corresponding to each sentence, then generate a video picture segment matching the voice corresponding to each sentence based on the original news and the original video, and finally sequentially splice the video picture segment matching the voice corresponding to each sentence to generate the video picture corresponding to the video voice. A video picture segment matching a voice corresponding to a sentence may present the sentence or a thing involved in the sentence.

Step 305 includes synthesizing the video picture and the video voice to obtain the target video.

In this embodiment, the execution body may synthesize the video picture and the video voice to obtain the target video. A voice corresponding to a sentence is used as an audio part corresponding to the sentence in the target video, and a video picture segment matching the voice corresponding to the sentence is used as a video picture part corresponding to the sentence in the target video.

According to the method for acquiring a video provided by some embodiments of the present disclosure, the original news and the original video related to the original news are first acquired; the summary of the original news is extracted to obtain the commentary of the original news; the video voice is generated based on the commentary, and the video picture corresponding to the video voice is generated based on the original news and the original video; and finally the video picture and the video voice are synthesized to obtain the target video. The original news is converted into the target video for display, and the target video records the main content of the original news, and the user can quickly know the news event targeted by the original news by watching the target video, so that the user does not need to read the full text of the original news, thereby improving the efficiency of the user in obtaining news event information.

Figure 4:
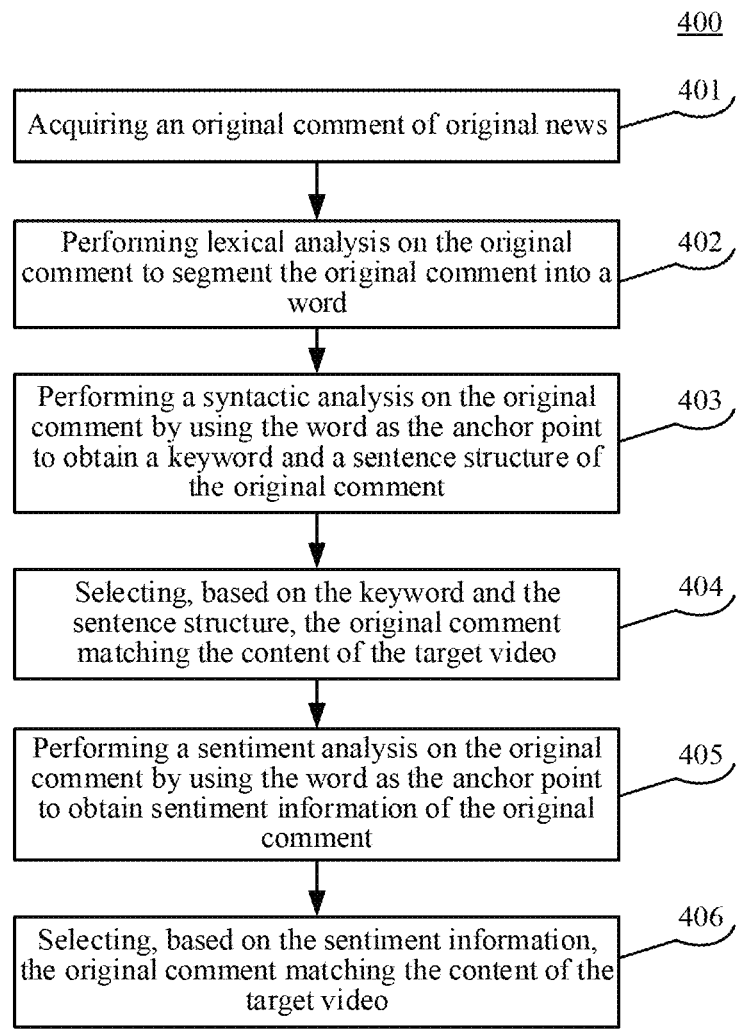
FIG. 4 is a flowchart of a method for acquiring a comment according to some embodiments of the present disclosure.

Further referring to FIG. 4, FIG. 4 shows a flow 400 of a method for acquiring a comment according to some embodiments of the present disclosure. The method for acquiring a comment includes steps 401 to 406.

Step 401 includes acquiring an original comment of original news.

In this embodiment, an execution body of the method for acquiring a comment (for example, the server 105 shown in FIG. 1) may acquire the original comment of the original news. The original comment may be a comment posted by a user browsing the original news on a news application.

Step 402 includes performing lexical analysis on the original comment to segment the original comment into a word.

In this embodiment, the execution body may perform the lexical analysis on the original comment to segment the original comment into the word. The original comment is generally a Chinese comment. Unlike an English comment, Chinese words in the Chinese comment are not separated by spaces. In order to improve an accuracy of word segmentation, the original comment may be segmented into words by using LAC. The LAC, as a combined lexical analysis model, can integrally complete NLP tasks such as Chinese word segmentation, part-of-speech tagging, and proper name recognition. Based on a stacked two-way GRU structure, the LAC accurately replicates, on a long text, a lexical analysis algorithm on an AI open platform.

Step 403 includes performing syntactic analysis on the original comment by using the word as the anchor point to obtain a keyword and a sentence structure of the original comment.

In this embodiment, the execution body may perform the syntactic analysis on the original comment by using the word as the anchor point to obtain the keyword and the sentence structure of the original comment.

Generally, when the word is used as the anchor point to perform the syntactic analysis on the original comment, part-of-speech tagging may be performed on the word in the original comment to obtain the keyword and the sentence structure of the original comment. The keyword of the original comment may be a word of a specific part of speech. The sentence structure of the original comment may include, but is not limited to, a subject-predicate relationship, a verb-object relationship, a preposition-object relationship, an orientation relationship, and the like, and is determined by analyzing a dependency relationship between words in the original comment. A syntactic dependency analysis is one of the core technologies of natural language processing, and aims to determine a syntactic structure of a sentence by analyzing a dependency relationship between words in the sentence. The syntactic dependency analysis, as an underlying technology, can be directly used to improve the effects of other NLP tasks. These effects may include, but are not limited to, semantic role tagging, semantic matching, event extraction, and the like. A syntactic dependency analysis tool developed based on deep learning and large-scale tagging data may be used to perform the syntactic analysis on the original comment, and may help the user to directly obtain a pair of related words and a word pair of a long-distance dependency in the original comment.

Step 404 includes selecting, based on the keyword and the sentence structure, the original comment matching the content of the target video.

In this embodiment, the execution body may select, based on the keyword and the sentence structure, the original comment matching the content of the target video. An original comment with a specific sentence structure and a keyword appearing in the target video is the original comment matching the content of the target video.

By selecting based on the keyword, an original comment that does not match the content of the target video may be filtered out, so that the selected original comment more closely matches the content of the target video. By selecting based on the sentence structure, an original comment that is not suitable for being used as a bullet screen may be filtered out, so that the selected original comment is more suitable to be displayed in the form of a bullet screen when the target video is played. For example, for an original comment having a subject-predicate relationship, a keyword of the original comment includes Person A. If Person A also appears in the target video, the original comment not only matches the content of the target video, but is also suitable to be displayed as a bullet screen. For another example, for an original comment having an orientation relationship, the original comment is not suitable to be displayed as a bullet screen.

Step 405 includes performing sentiment analysis on the original comment by using the word as the anchor point to obtain sentiment information of the original comment.

In this embodiment, the execution body perform the sentiment analysis on the original comment by using the word as the anchor point to obtain the sentiment information of the original comment. The original comment may be the comment posted by the user browsing the original news on the news application. The sentiment information may express an attitude of the user posting the original comment.

Generally, the original comment posted by the user browsing the original news is generally accompanied by a user subjective description of the original news. For a Chinese text with a subjective description, the sentiment tendency analysis may automatically determine a sentiment polarity type of the text and provide a corresponding confidence. Common sentiment analysis models may include, but are not limited to, sentiment analysis LSTM (Long Short-Term Memory), sentiment analysis GRU, dialogue sentiment recognition, and the like. The sentiment analysis LSTM realizes the sentiment tendency analysis based on a LSTM structure, and sentiment types are divided into positive and negative. The sentiment analysis GRU realizes the sentiment tendency analysis based on a GRU structure, and sentiment types are divided into positive and negative. The dialogue sentiment recognition focuses on recognizing user sentiment in an intelligent dialogue scenario. For a user text in the intelligent dialogue scenario, the dialogue sentiment recognition may automatically determine a sentiment type of the text and provide a corresponding confidence, and sentiment types are divided into positive, negative and neutral. This model is based on TextCNN (a multi-convolution kernel CNN model), and can better capture a local relevance of a sentence.

Step 406 includes selecting, based on the sentiment information, the original comment matching the content of the target video.

In this embodiment, the execution body may select, based on the sentiment information, the original comment matching the content of the target video. An original comment with a same sentiment type as the target video is the original comment matching the content of the target video.

By selecting based on the sentiment information, an original comment that does not match sentiment of the target video may be filtered out, so that the selected original comment more closely matches the sentiment of the target video. For example, for original news of mourning the death of Person A, an original comment expressing sentiment information such as sadness and regret may be selected.

According to the method for acquiring a comment provided by some embodiments of the present disclosure, the lexical analysis is first performed on the original comment of the original news to segment the original comment into the word; then, the syntactic analysis is performed on the original comment by using the word as the anchor point to obtain the keyword and the sentence structure of the original comment, and based on the keyword and the sentence structure, the original comment matching the content of the target video is selected; and meanwhile, the sentiment analysis is performed on the original comment by using the word as the anchor point to obtain the sentiment information of the original comment, and based on the sentiment information, the original comment matching the content of the target video is selected. In this way, the selected original comment not only matches the content of the target video, but is also suitable to be displayed as a bullet screen. Meanwhile, the selected original comment more closely matches the sentiment of the target video.

Figure 5:
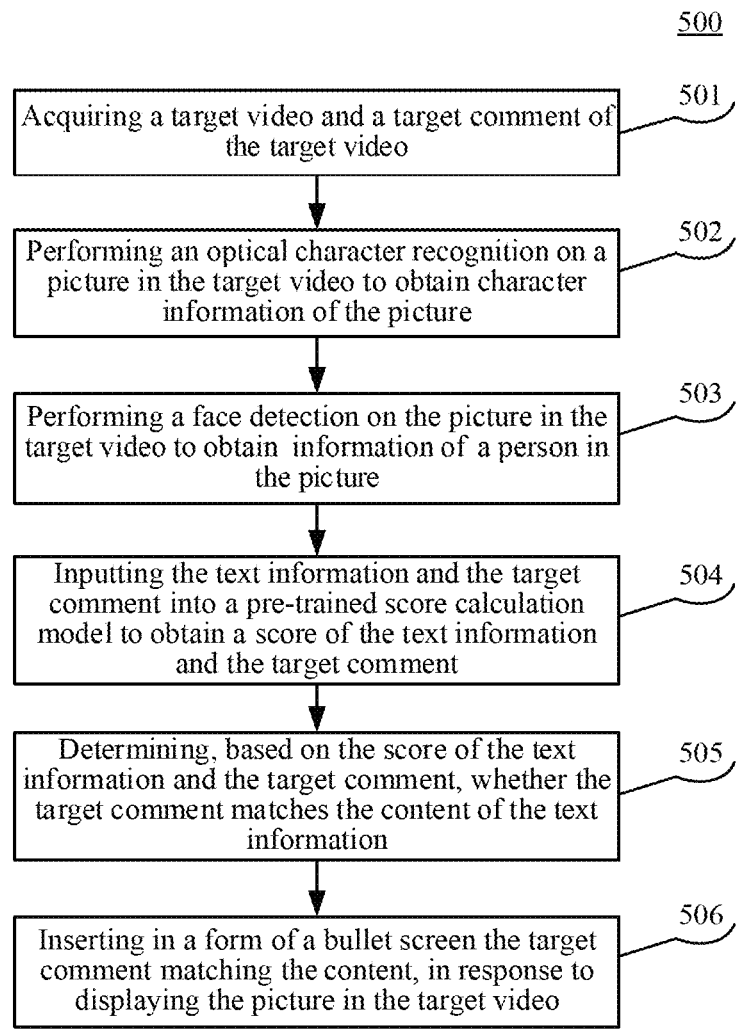
FIG. 5 is a flowchart of the method for processing a video according to some other embodiments of the present disclosure.

Further referring to FIG. 5, FIG. 5 shows a flow 500 of another embodiment of the method for processing a video according to the present disclosure. The method for processing a video includes steps 501 to 506.

Step 501 includes acquiring a target video and a target comment of the target video.

In this embodiment, a specific operation of step 501 is described in detail in step 201 in embodiments shown in FIG. 2, and details are not described herein.

Step 502 includes performing optical character recognition on a picture in the target video to obtain text information of the picture.

In this embodiment, an execution body of the method for processing a video (for example, the server 105 shown in FIG. 1) may recognize the picture in the target video by using an OCR (Optical Character Recognition) technology to obtain the character information of the picture.

Generally, a text may appear on the picture in the target video, and the text information of the picture may be recognized by using the OCR technology. The OCR technology has been widely used in various application scenarios. In order to improve the calculation efficiency, PP-OCR may be used. The PP-OCR, as a practical ultra-lightweight OCR, is mainly composed of three parts, i.e., DB text detection, detection box correction and CRNN text recognition. The PP-OCR adopts 19 effective strategies to perform effect optimizing and slimming on a model of each module from 8 aspects, i.e., backbone network selection and adjustment, head design prediction, data enhancement, learning rate transformation strategy, regularization parameter selection, pre-trained model use, and model auto-cropping quantization, and finally an ultra-lightweight Chinese and English OCR with an overall size of 3.5M and an English digital OCR with an overall size of 2.8M are obtained.

Step 503 includes performing a face detection on the picture in the target video to obtain information of a person in the picture.

In this embodiment, the execution body may perform the face detection on the picture in the target video to obtain the information of the person in the picture.

Generally, there is a face on the picture in the target video, so that the face on the picture may be recognized, and information of a person corresponding to the face is used as text information of the picture. In particular, more personal information may be introduced for a picture where there is a face of a celebrity.

Step 504 includes inputting the text information and the target comment into a pre-trained score calculation model to obtain a score of the text information and the target comment.

In this embodiment, the execution body may input the text information and the target comment into the pre-trained score calculation model to obtain the score of the text information and the target comment. The score calculation model may be used to represent a corresponding relationship between a combination of the text information of the pictures and the comments, and a score, and may quickly and accurately select the matching target comment for the picture in the target video.

In some alternative implementations of this embodiment, the execution body may pre-train the score calculation model according to the following steps.

First, a set of training samples may be acquired.

The training samples may include text information of pictures and comments, and tagged scores of the text information of the pictures and the comments. For example, the scores may be tagged manually based on matching degrees between the text information of the pictures and the comments.

Then, a model structure of an initial score calculation model may be determined, and model parameters of the initial score calculation model may be initialized.

Alternatively, the initial score calculation model may include a convolutional neural network. Since the convolutional neural network is a multilayer neural network, where each layer is composed of a plurality of two-dimensional planes and each plane is composed of a plurality of independent neurons, what layers (such as a convolutional layer, a pooling layer, and an excitation function layer) are included in the initial score calculation model of the convolutional neural network type, a connection order relationship between the layers, and what parameters (such as a weight, a bias, a step size of convolution) are included in each layer, and the like, are needed to be determined. The convolutional layer may be used to extract features. For each convolutional layer, following items may be determined: a number of convolutional cores, a size of each convolutional core, a weight of each neuron in each convolutional core, a bias term corresponding to each convolutional core, a step size between two adjacent convolutions, whether filling is needed, how many pixel points to fill, and a value for filling (generally the value is 0), and the like. The pooling layer may be used to perform down sample on input information to compress the amount of data and parameters to reduce over-fitting. A pooling approach of the pooling layer may be determined for each pooling layer (such as taking an average value of the area or taking a maximum value of the area). The excitation function layer is used to perform non-linear calculation of the input information. A specific excitation function may be determined for each excitation function layer. For example, activation functions may be ReLU and various variants of ReLU activation functions, Sigmoid functions, Tanh (Hyperbolic Tangent) functions, Maxout functions, and the like.

Then, the model parameters of the initial score calculation model may be initialized. In practice, model parameters of the initial score calculation model may be initialized with some different small random numbers. The small random numbers are used to ensure that the model does not enter a saturation state due to excessive weight, resulting in training failure, and the numbers being different are used to ensure that the model may learn normally.

Subsequently, the text information of the pictures and the comments in the training samples in the set of the training samples may be used as an input of the initial score calculation model, the tagged scores in the training samples may be used as an output of the initial score calculation model, and the initial score calculation model is trained through a machine learning method.

Specifically, the text information of the pictures and the comments in the training samples in the set of the training samples may first be input into the initial score calculation model to obtain scores of the text information of the pictures and the comments. Differences between obtained scores and the tagged scores in the training samples may then be calculated. Finally, the model parameters of the initial score calculation model may be adjusted based on the calculated differences, and the training may be ended if a preset training end condition is satisfied. For example, the preset training end condition may include at least one of a training period exceeding a preset duration, a number of trainings exceeding a preset number, or a calculated difference being greater than a preset difference threshold.

various implementations may be adopted to adjust the model parameters of the initial score calculation model based on the differences between the obtained scores and the tagged scores in the training samples. For example, SGD (Stochastic Gradient Descent), Newton's Method, Quasi-Newton Methods, Conjugate Gradient, heuristic optimization methods, and other various optimization algorithms now known or developed in the future may be adopted.

Finally, the trained initial score calculation model may be determined as the pre-trained score calculation model.

Step 505 includes determining, based on the score of the text information and the target comment, whether the target comment matches the content of the text information.

In this embodiment, the execution body may determine, based on the score of the text information and the target comment, whether the target comment matches the content of the text information. For example, a target comment with a score higher than a preset threshold is determined as the target comment matching the content of the text information of the picture. For another example, the target comment with the highest score is determined as the target comment matching the content of the text information.

Step 506 includes inserting, in response to displaying the picture in the target video, the target comment matching the content in a form of a bullet screen.

In this embodiment, a specific operation of step 506 is described in detail in step 204 in embodiments shown in FIG. 2, and details are not described herein.

As can be seen from FIG. 5, in comparison with the corresponding embodiment in FIG. 2, the method for processing a video in this embodiment highlights the step of matching the picture in the target video with the target comment. Thus, the solution described in this embodiment acquires sufficient information from the picture of the target video and the target comment, determines the display moment when the target comment should be displayed in the target video by using the score calculation model, and inserts the target comment in the form of the bullet screen at this moment, so that when the video is played, the comment for the specific content can be displayed simultaneously with the picture having the specific content, thereby facilitating users to understand comments and further helping video viewers interact based on the comments.

Figure 6:
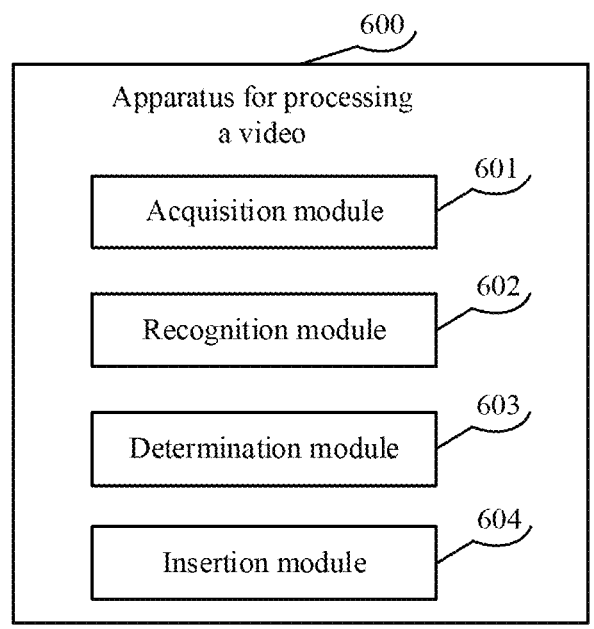
FIG. 6 is a schematic structural diagram of an apparatus for processing a video according to some embodiments of the present disclosure.

Further referring to FIG. 6, as an implementation of the method shown in each of the above figures, the disclosure provides an apparatus for processing a video according to some embodiments. The embodiments of the apparatus correspond to the embodiments of the method shown in FIG. 2, and the apparatus is particularly applicable to various electronic devices.

As shown in FIG. 6, the apparatus 600 for processing a video of this embodiment may include: an acquisition module 601, a recognition module 602, a determination module 603 and an insertion module 604. The acquisition module 601 is configured to acquire a target video and a target comment of the target video; the recognition module 602 is configured to recognize a picture in the target video to obtain text information of the picture; the determination module 603 is configured to determine a target comment matching a content of the text information; and the insertion module 604 is configured to insert, in response to displaying the picture in the target video, the target comment matching the content in a form of a bullet screen.

In this embodiment, the specific processing of the acquisition module 601, the recognition module 602, the determination module 603 and the insertion module 604 of the apparatus 600 for processing a video and the technical effects thereof may be described with reference to the relevant description of steps 201 to 204 in the embodiments corresponding to FIG. 2, and details are not described herein.

In some alternative implementations of the embodiments, the acquiring module 601 includes a first acquisition submodule, configured to acquire original news; a search submodule, configured to search for an original video related to the original news; an extraction submodule, configured to extract a summary of the original news to obtain a commentary of the original news; a generation submodule, configured to generate, based on the commentary, a video voice, and generate, based on the original news and the original video, a video picture corresponding to the video voice; and a synthesis submodule, configured to synthesize the video picture and the video voice to obtain the target video.

In some alternative implementations of the embodiments, the search submodule is further configured to: acquire an original comment of the original news; and search for, based on the original news and/or a content of the original comment, the original video.

In some alternative implementations of the embodiments, the acquisition module 601 includes a second acquisition submodule, configured to acquire an original comment of the original news; and a selection submodule, configured to select an original comment matching a content of the target video as the target comment.

In some alternative implementations of the embodiments, the selection submodule includes a segmentation unit, configured to perform lexical analysis on the original comment to segment the original comment into a word; and a selection unit, configured to analyze the original comment by using the word as an anchor point, and select the original comment matching the content of the target video.

In some alternative implementations of the embodiments, the selection unit is further configured to: perform syntactic analysis on the original comment by using the word as the anchor point to obtain a keyword and a sentence structure of the original comment; and select, based on the keyword and the sentence structure, the original comment matching the content of the target video.

In some alternative implementations of the embodiments, the selection unit is further configured to: perform sentiment analysis on the original comment by using the word as the anchor point to obtain sentiment information of the original comment; and select, based on the sentiment information, the original comment matching the content of the target video.

In some alternative implementations of the embodiments, the recognition module 602 is further configured to: perform optical character recognition on the picture in the target video to obtain text information of the picture.

In some alternative implementations of the embodiments, the recognition module 602 is further configured to: perform a face detection on the picture in the target video to obtain information of a person in the picture.

In some alternative implementations of the embodiments, the determination module 603 is further configured to: input the text information and the target comment into a pre-trained score calculation model to obtain a score of the text information and the target comment; and determine, based on the score of the text information and the target comment, whether the target comment matches the content of the text information.

According to embodiments of the disclosure, the disclosure further provides an electronic device, a readable storage medium and a computer program product.

Figure 7:
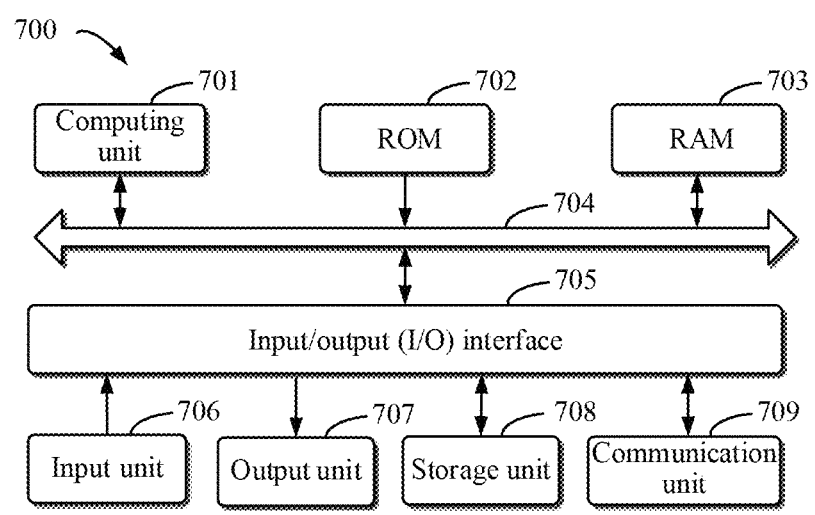
FIG. 7 is a block diagram of an electronic device adapted to implement the method for processing a video according to some embodiments of the present disclosure.

FIG. 7 shows a schematic block diagram of an electronic device 700 adapted to implement embodiments of the disclosure. The electronic device is intended to represent various forms of digital computers, such as laptops, desktops, worktables, personal digital assistants, servers, blade servers, mainframe computers and other suitable computers. The electronic device may alternatively represent various forms of mobile devices, such as personal digital processing, cellular phones, smart phones, wearable devices and other similar computing devices. The components, their connections and relationships, and their functions shown herein are examples only, and are not intended to limit the implementations of the disclosure as described and/or claimed herein.

As shown in FIG. 7, the device 700 may include a computing unit 701, which may execute various appropriate actions and processes in accordance with a computer program stored in a read-only memory (ROM) 702 or a computer program loaded into a random-access memory (RAM) 703 from a storage unit 708. The RAM 703 may alternatively store various programs and data required by operations of the device 700. The computing unit 701, the ROM 702 and the RAM 703 are connected to each other through a bus 704. An input/output (I/O) interface 705 is also connected to the bus 704.

Multiple components of the device 700 are connected to the I/O interface 705, and include: an input unit 706, such as a keyboard and a mouse; an output unit 707, such as various types of displays and a speaker; a storage unit 708, such as a magnetic disk and an optical disk; and a communication unit 709, such as a network card, a modem and a wireless communication transceiver. The communication unit 709 allows the device 700 to exchange information or data with other devices through a computer network, such as the Internet and/or various telecommunications networks.

The computing unit 701 may be various general-purpose and/or specific-purpose processing components having processing and computing capabilities. Some examples of the computing unit 701 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 701 performs various methods and processing described above, such as the method for processing a video. For example, in some embodiments, the method for processing a video may be implemented as a computer software program, which is tangibly included in a machine-readable medium, such as the storage unit 708. In some embodiments, part or all of the computer program may be loaded and/or installed on the device 700 through the ROM 702 and/or the communication unit 709. When the computer program is loaded into the RAM 703 and executed by the computing unit 701, one or more steps of the method for processing a video described above may be performed. Alternatively, in other embodiments, the computing unit 701 may be configured to perform the method for processing a video in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of some embodiments of the disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a standalone software package and partly on a remote machine, or entirely on the remote machine or a server.

In the context of some embodiments of the disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

It should be appreciated that the steps of reordering, adding or deleting may be executed using the various forms shown above. For example, the steps described in the disclosure may be executed in parallel or sequentially or in a different order, so long as the expected results of the technical solutions provided in the disclosure may be realized, and no limitation is imposed herein.

The above specific implementations are not intended to limit the scope of the disclosure. It should be appreciated by those skilled in the art that various modifications, combinations, sub-combinations, and substitutions may be made depending on design requirements and other factors. Any modification, equivalent and modification that fall within the spirit and principles of the disclosure are intended to be included within the scope of the disclosure.

What is claimed is:

1. A method for processing a video, the method comprising:
    acquiring a target video and a first target comment of the target video;
    recognizing a picture in the target video to obtain text information of the picture;
    determining a second target comment matching a content of the text information from the first target comment; and
    inserting, in response to displaying the picture in the target video, the second target comment matching the content in a form of a bullet screen,
    wherein acquiring the target video comprises:
        acquiring original news;
        searching for an original video related to the original news;
        extracting a summary of the original news to obtain a commentary of the original news;
        generating, based on the commentary, a video voice, and generating, based on the original news and the original video, a video picture corresponding to the video voice; and
        synthesizing the video picture and the video voice to obtain the target video.

2. The method according to claim 1, wherein searching for the original video related to the original news, comprises:
    acquiring an original comment of the original news; and
    searching for, based on the original news and/or a content of the original comment, the original video.

3. The method according to claim 1, wherein acquiring the first target comment of the target video comprises:
    acquiring an original comment of the original news; and
    selecting an original comment matching a content of the target video as the first target comment.

4. The method according to claim 3, wherein selecting the original comment matching the content of the target video comprises:
    performing lexical analysis on the original comment to segment the original comment into a word; and
    analyzing the original comment by using the word as an anchor point, and selecting the original comment matching the content of the target video.

5. The method according to claim 4, wherein analyzing the original comment by using the word as the anchor point, and selecting the original comment matching the content of the target video comprises:
    performing a syntactic analysis on the original comment by using the word as the anchor point to obtain a keyword and a sentence structure of the original comment; and
    selecting, based on the keyword and the sentence structure, the original comment matching the content of the target video.

6. The method according to claim 4, wherein analyzing the original comment by using the word as the anchor point, and selecting the original comment matching the content of the target video comprises:
    performing a sentiment analysis on the original comment by using the word as the anchor point to obtain sentiment information of the original comment; and
    selecting, based on the sentiment information, the original comment matching the content of the target video.

7. The method according to claim 1, wherein recognizing the picture in the target video to obtain the text information of the picture comprises:
performing an optical character recognition on the picture in the target video to obtain character information of the picture.

8. The method according to claim 1, wherein recognizing the picture in the target video to obtain the text information of the picture comprises:
performing a face detection on the picture in the target video to obtain information of a person in the picture.

9. The method according to claim 1, wherein determining the second target comment matching the content of the text information from the first target comment comprises:
inputting the text information and the first target comment into a pre-trained score calculation model to obtain a score of the text information and the first target comment; and
determining, based on the score of the text information and the first target comment, whether the first target comment matches the content of the text information.

10. An electronic device, comprising:
at least one processor; and
a memory that stores instructions executable by the at least one processor, wherein the instructions, when executed by the at least one processor, cause the at least one processor to perform operations comprising:
acquiring a target video and a first target comment of the target video;
recognizing a picture in the target video to obtain text information of the picture;
determining a second target comment matching a content of the text information; and
inserting, in response to displaying the picture in the target video, the second target comment matching the content in a form of a bullet screen,
wherein acquiring the target video comprises:
acquiring original news;
searching for an original video related to the original news;
extracting a summary of the original news to obtain a commentary of the original news;
generating, based on the commentary, a video voice, and generating, based on the original news and the original video, a video picture corresponding to the video voice; and
synthesizing the video picture and the video voice to obtain the target video.

11. The electronic device according to claim 10, wherein searching for the original video related to the original news comprises:
acquiring an original comment of the original news; and
searching for, based on the original news and/or a content of the original comment, the original video.

12. The electronic device according to claim 10, wherein acquiring the first target comment of the target video comprises:
acquiring an original comment of the original news; and
selecting an original comment matching a content of the target video as the first target comment.

13. The electronic device according to claim 12, wherein selecting the original comment matching the content of the target video comprises:

performing lexical analysis on the original comment to segment the original comment into a word; and
analyzing the original comment by using the word as an anchor point, and selecting the original comment matching the content of the target video.

14. The electronic device according to claim 13, wherein analyzing the original comment by using the word as the anchor point, and selecting the original comment matching the content of the target video comprises:
performing a syntactic analysis on the original comment by using the word as the anchor point to obtain a keyword and a sentence structure of the original comment; and
selecting, based on the keyword and the sentence structure, the original comment matching the content of the target video.

15. The electronic device according to claim 13, wherein analyzing the original comment by using the word as the anchor point, and selecting the original comment matching the content of the target video comprises:
performing a sentiment analysis on the original comment by using the word as the anchor point to obtain sentiment information of the original comment; and
selecting, based on the sentiment information, the original comment matching the content of the target video.

16. The electronic device according to claim 10, wherein recognizing the picture in the target video to obtain the text information of the picture comprises:
performing an optical character recognition on the picture in the target video to obtain character information of the picture.

17. The electronic device according to claim 10, wherein recognizing the picture in the target video to obtain the text information of the picture comprises:
performing a face detection on the picture in the target video to obtain information of a person in the picture.

18. A non-transitory computer-readable storage medium storing computer instructions, which cause a computer to perform operations comprising:
acquiring a target video and a target comment of the target video;
recognizing a picture in the target video to obtain text information of the picture;
determining a target comment matching a content of the text information; and
inserting, in response to displaying the picture in the target video, the target comment matching the content in a form of a bullet screen,
wherein acquiring the target video comprises:
acquiring original news;
searching for an original video related to the original news;
extracting a summary of the original news to obtain a commentary of the original news;
generating, based on the commentary, a video voice, and generating, based on the original news and the original video, a video picture corresponding to the video voice; and
synthesizing the video picture and the video voice to obtain the target video.

* * * * *